US006994382B2

(12) United States Patent
Peterson et al.

(10) Patent No.: US 6,994,382 B2
(45) Date of Patent: Feb. 7, 2006

(54) RETAINING FEATURE FOR CORRUGATED ACOUSTIC DUCT

(75) Inventors: Charles Bryan Peterson, White Lake, MI (US); Stephen Joseph Hamby, Livonia, MI (US); Milap Kanu Shah, Plymouth, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/883,092

(22) Filed: Jul. 1, 2004

(65) Prior Publication Data

US 2006/0001266 A1    Jan. 5, 2006

(51) Int. Cl.
F16L 15/00    (2006.01)

(52) U.S. Cl. .................. 285/401; 285/391; 285/903
(58) Field of Classification Search ................ 285/903, 285/401, 391
See application file for complete search history.

(56) References Cited

U.S. PATENT DOCUMENTS

| | | | |
|---|---|---|---|
| 922,805 A | 5/1909 | Nelson et al. | |
| 2,475,322 A * | 7/1949 | Horton et al. | 285/391 |
| 3,131,952 A | 5/1964 | D'Esopo | |
| 3,813,115 A | 5/1974 | French | |
| 3,858,913 A | 1/1975 | Gallagher | |
| 3,922,009 A * | 11/1975 | Giebeler | 285/391 |
| 3,929,359 A | 12/1975 | Schmunk et al. | |
| 4,082,327 A | 4/1978 | Sting et al. | |
| 4,174,858 A | 11/1979 | Brooks | |
| 4,247,136 A | 1/1981 | Fouss et al. | |
| 4,286,808 A | 9/1981 | Fouss et al. | |
| 4,457,544 A * | 7/1984 | Snow et al. | 285/903 |
| 4,468,535 A | 8/1984 | Law | |
| 4,480,855 A * | 11/1984 | Rosenbaum | 285/903 |
| 4,575,133 A | 3/1986 | Nattel | |
| 4,683,917 A | 8/1987 | Bartholomew | |
| 4,875,714 A | 10/1989 | Lee | |
| 4,969,670 A | 11/1990 | Bonnema et al. | |
| 5,004,272 A | 4/1991 | Kipp | |
| 5,042,844 A * | 8/1991 | Iida et al. | 285/903 |
| 5,228,727 A | 7/1993 | Tokutake et al. | |
| 5,292,156 A | 3/1994 | Sasa et al. | |
| 5,346,264 A | 9/1994 | Law et al. | |
| 5,403,043 A * | 4/1995 | Smet | 285/391 |
| 5,560,163 A | 10/1996 | Carlton | |
| 5,725,258 A | 3/1998 | Kujawski | |
| 5,875,976 A * | 3/1999 | Nelson et al. | 285/391 |
| 6,007,110 A | 12/1999 | Amatsutsu | |
| 6,209,929 B1 * | 4/2001 | Ikegami et al. | 285/903 |
| 6,283,511 B1 | 9/2001 | Kamp | |
| 6,315,333 B1 | 11/2001 | Collins | |
| 6,517,120 B1 | 2/2003 | Miyajima et al. | |

FOREIGN PATENT DOCUMENTS

DE    103 42 809 A1    4/2004
EP    0 666 461 A1    8/1995

* cited by examiner

Primary Examiner—David Bochna
(74) Attorney, Agent, or Firm—Brinks Hofer Gilson & Lione

(57) ABSTRACT

A retaining feature is provided for connecting a plastic tube to a corrugated acoustic duct. The retaining feature accommodates variations in the undulations and thread pattern of the corrugated duct, while at the same time minimizing the materials, specialized equipment or tools, labor and cost of making a successful connection. The retaining feature includes at least one barb extending circumferentially around the exterior surface of the plastic tube. Each barb is sized and structured to engage an undulation of the corrugated duct.

27 Claims, 2 Drawing Sheets

RETAINING FEATURE FOR CORRUGATED ACOUSTIC DUCT

FIELD OF THE INVENTION

The present invention relates generally to corrugated acoustic ducts commonly found in air routing systems in automobiles, and more particularly relates to the retaining features for connecting a plastic tube to the corrugated acoustic duct.

BACKGROUND OF THE INVENTION

Corrugated acoustic ducts are commonly used in the air handling systems of automobiles. Such corrugated ducts are formed of a series of undulations creating a spiral pattern much like the thread on a fastener. A corrugation is comprised of multiple undulations, and an undulation consists of one full ridge and one full groove which lie parallel to one another. This structure can clearly be seen in FIG. 1, which depicts a corrugated acoustic duct 10 having a series of undulations 12 defined by alternating ridges 14 and grooves 16. The undulations are disposed at a helical angle ED. For example, a Sonoflex™ acoustic duct is manufactured by West Akron, 571 Kennedy Rd., Akron, Ohio.

Unfortunately, such corrugated acoustic ducts are manufactured with a number of undulations that varies for a set distance D along the length of the tube. Thus, the thread pattern also varies, and the size of each ridge or groove may also vary within certain tolerances. Accordingly, the automotive industry has traditionally connected cylindrical plastic tubing to the acoustic tubing through the use of adhesives, staples, rivets, clamps, plastic over-molding processes, or a combination of the above. While these traditional retention features accommodate the variance in the undulations and thread pattern, they result in additional materials, specialized equipment and tools for connection and installation, increased labor and higher cost in order to make a successful connection which does not allow water through.

Accordingly, there exists a need to provide a retention feature for connecting a plastic tube to a corrugated acoustic duct which accommodates the variance in undulations and thread pattern, while minimizing the materials, specialized equipment and tools, labor and cost of making a successful connection.

BRIEF SUMMARY OF THE INVENTION

The present invention provides a retaining feature for connecting a plastic tube to a corrugated acoustic duct that accommodates variations in the undulations and thread pattern, while at the same time minimizing the materials, specialized equipment or tools, labor and cost of making a successful connection. The retaining feature includes at least one barb extending circumferentially around the exterior surface of the plastic tube. Each barb is sized and structured to engage an undulation of the corrugated duct.

According to more detailed aspects, each barb preferably has a width greater than an average width of a ridge. Each barb preferably has a height greater than or equal to the height of a ridge. Each barb preferably includes a leading edge and a trailing edge defined by the relative rotation of the tube and corrugated duct during assembly. The leading edge preferably is oriented at an angle less than or equal to 45° to facilitate assembly of the tube and corrugated duct. The trailing edge is preferably oriented at an angle of about 90° to hamper disassembly of the tube and corrugated duct. Each barb preferably extends circumferentially around the tube at a helical angle of about the average helical angle of the undulations of the corrugated duct.

According to more detailed aspects, each barb preferably extends less than 360° around the tube. When multiple barbs are used, each barb is preferably aligned along a helical path. Each barb may extend circumferentially around the tube different distances. For example, a first set of barbs may span about 10° while a second set of barbs may span about 35°. The multiple barbs are preferably equidistantly spaced around the tube.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Figure 1:
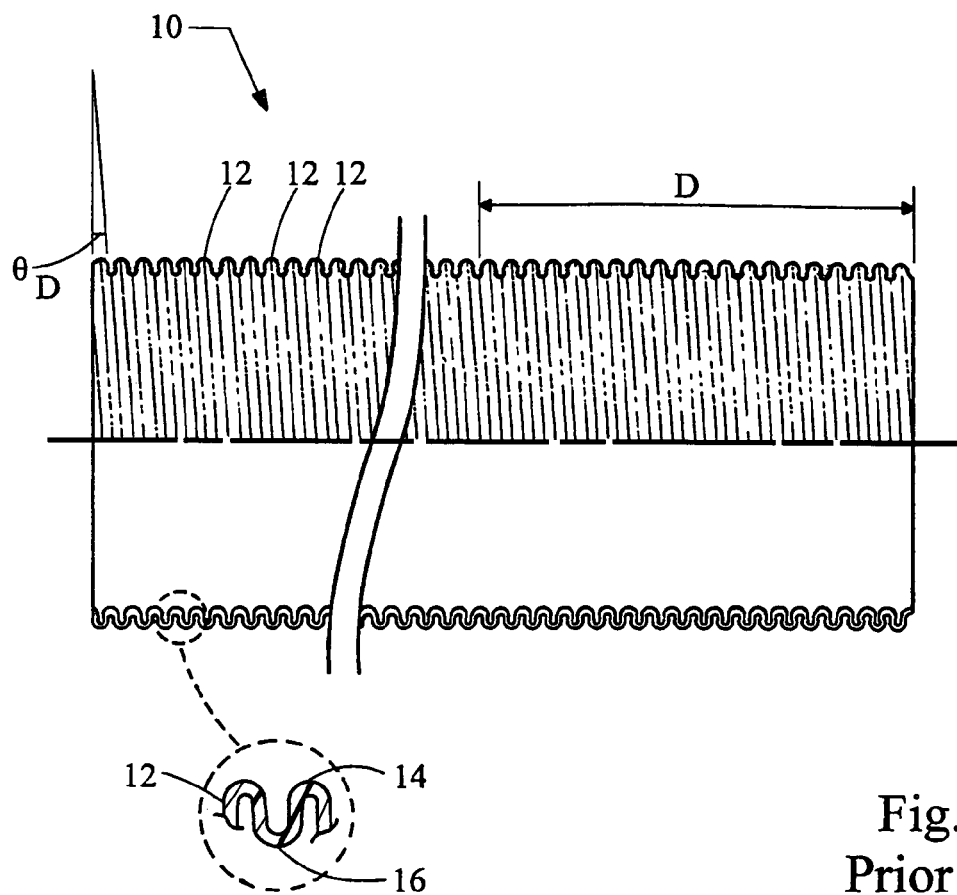
FIG. 1 is a side view, partly in section and partly enlarged, of a corrugated acoustic duct which can be found in the prior art.
Figure 2:
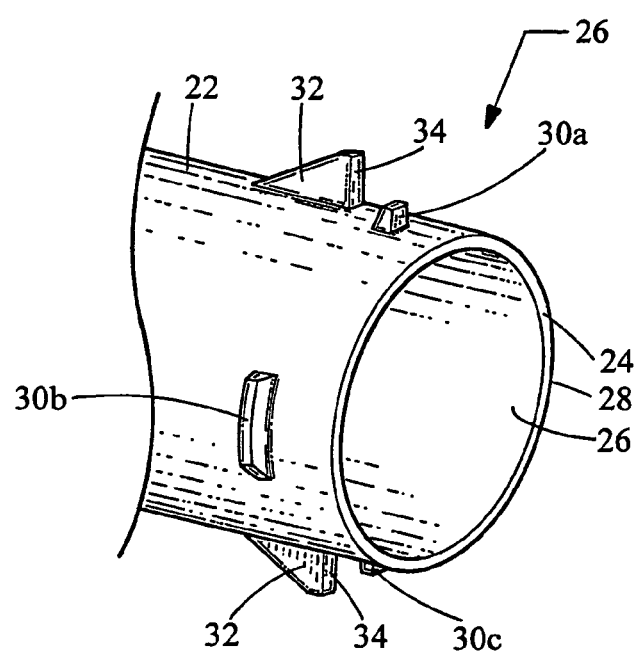
FIG. 2 is a perspective view of a plastic tube having the retaining feature constructed in accordance with the teachings of the present invention.
Figure 3:
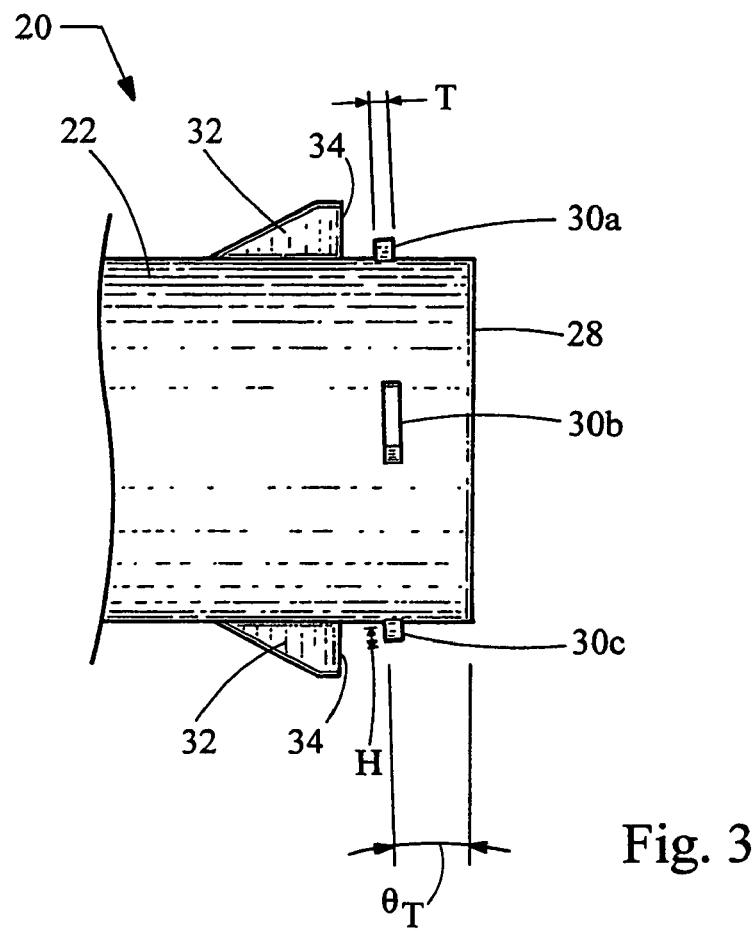
FIG. 3 is a side view of the plastic tube with retaining feature depicted in FIG. 2.
Figure 4:
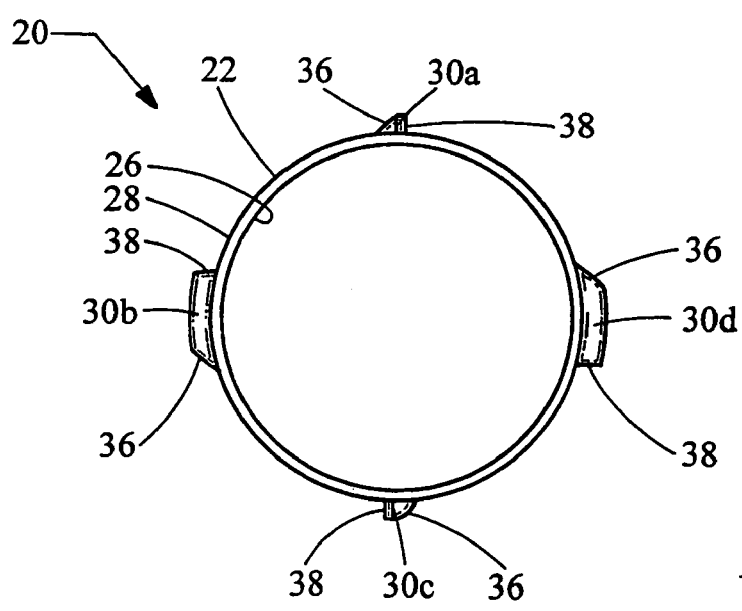
FIG. 4 is an end view of the plastic tube and retaining feature depicted in FIGS. 2 and 3.

Turning now to the figures, FIGS. 2, 3 and 4 depict various views of a retaining feature 20 formed on a plastic tube 22 in accordance with the teachings of the present invention. The retaining feature 20 is designed to provide a successful connection of the plastic tube 22 to the corrugated acoustic duct 10 depicted in FIG. 1. The plastic tube 22 generally includes a free end 28, and is cylindrical in nature defined by an inner surface 26 and an outer surface 28. The plastic tube 22 is sized to fit inside the corrugated duct 10, and thus the outer diameter of the tube 22 is sized to fit within the inner diameter of the corrugated duct 10 defined by the grooves 16 of the undulations 12. It will be recognized by those skilled in the art that the plastic tube 22 could be designed to fit over the corrugated duct 10, and thus would have an inner diameter that is greater than the outer diameter of the duct 10. Likewise, and thus the retaining feature 20 would be formed on the inner surface 26 of the tube 22. As shown in FIGS. 2–4, the retaining feature 20 has been depicted formed on the outer surface 28 of the plastic tube 22.

The retaining feature 20 generally includes one or more barbs 30 projecting radially from the outer surface 28 of the plastic tube 22. As shown in the figures, four barbs 30a, 30b, 30c, 30d (FIG. 4) have been depicted. Each barb 30 is sized and structured to engage an undulation 12 of the corrugated duct 10, as will be described in more detail below. When multiple barbs 30 are employed as shown in the figures, the barbs 30 are preferably equidistantly spaced about the circumference of the tube 22.

The retaining feature 20 may also include one or more stop walls 32 also projecting radially from the outer surface 28 of the plastic tube 22. Two stop walls 32 have been depicted and are diametrically opposed. Each stop wall 32 includes an axially facing surface 34, which is located a predetermined distance from the free end 24 of the tube 22 to limit the amount of overlap between the duct 10 and tube 22. Each stop wall 32 preferably has a height greater than the height H of each barb 30.

As best seen in FIGS. 3 and 4, the first and third barbs 30a, 30c are diametrically opposed, while the second and fourth barbs 30b, 30d are also diametrically opposed. As can be seen from FIG. 4, the first and third barbs 30a, 30c extend circumferentially around the tube 22 a distance less than the second and fourth barbs 30b, 30d extend circumferentially around the tube 22. Preferably, the first and third barbs 30a, 30c span about 10°, while the second and fourth barbs 30b, 30d span about 35°. It will be recognized that any number of barbs 30 may be employed, including a single barb which would span around the circumference of the tube 22 one or more times.

As best seen in FIG. 4, each barb 30 preferably includes a leading edge 36 and a trailing edge 38. The terms "leading" and "trailing" are used in the context of rotating the corrugated duct 10 and plastic tube 22 relative to one another, thereby resulting in one edge of the barb 30 leading, while the opposing edge of the barb 30 trails the leading edge. The leading edge 36 is structured to be disposed at an angle relative to the outer surface 28 of the tube 22, and more particularly relative to a tangent line located at the center of each barb 30. The leading edge 36 is oriented at about 45° relative to the tangent line, but may be oriented at any angle between about 15° to 75°. The angled leading edge 36 of each barb 30 facilitates the assembly and interconnection of the corrugated duct 10 and plastic tube 22.

Unlike the leading edge 36, the trailing edge 38 of each barb 30 is oriented at about 90° relative to the tangent line, but may vary within 10 or so degrees as will be understood by those skilled in the art. The blunt trailing edge 38 is thus structured to hamper the disassembly of the corrugated duct 10 and tube 22 to prevent unwanted disconnection. However, the structure of the trailing edges 38 will not completely prevent the disassembly of the corrugated duct 10 and plastic tube 22.

As best seen in FIG. 3, the retaining barbs 30a, 30b, 30c, 30d are aligned along a helical angle $\theta_T$. The helical angle of the barbs 30 is designed to be about the average helical angle $\theta_D$ of the undulations 12 forming the corrugated duct 10. As such, the one or more barbs 30 form essentially a single thread which may traverse each of the undulations 12, irregardless of their variations in helical angle $\theta_D$. Likewise, by using multiple barbs 30 which span no more than 360°, excessive force is not required to rotate the corrugated duct 10 and plastic tube 22 relative to one another.

As also seen in FIG. 3, each barb 30 has a thickness T. The thickness T of each barb 30 is preferably greater than or equal to an average width of a ridge 14 of an undulation 12. Most preferably, each barb has a thickness of at least 150% greater than the average thickness of a ridge 14. In this way, each barb 30 frictionally engages the side walls forming the ridge 14 and provides a secure connection. Once assembled, each barb 30 causes the corresponding area of a ridge 14 to deform and enlarge to receive the barb 30. In this manner, a secure connection is formed.

Each barb 30 also has an average height H which represents a distance the barb 30 projects radially from the outer surface 28 of the tube 22. Preferably, the height H of each barb 30 is greater than or equal to the height of a ridge 14. Thus, the height H of each barb 30 causes the ridge 14 in the corresponding area to deform and enlarge to receive each barb 30. In this manner, a secure connection between the corrugated duct 10 and plastic tube 22 is formed.

Accordingly, it will be recognized by those skilled in the art that the retaining feature 20 of the present invention is structured to accommodate variations in the undulations 12 and thread pattern of the corrugated duct 10. At the same time, the retaining feature 20 eliminates the need for any adhesives, staples, rivets, clamps or over-molding processes, thereby minimizing the materials, specialized equipment or tools, labor and cost of making a successful connection between the corrugated duct 10 and a plastic tube 22.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A retaining feature for connecting a plastic tube to a corrugated acoustic duct commonly used in an automobile, the corrugated duct having a series of undulations defined by a set of ridges and grooves extending helically around the duct, the retaining feature comprising:

a plurality of barbs extending circumferentially around the exterior surface of the plastic tube along a helical path, each barb sized and structured to engage an undulation of the corrugated duct;

each barb having a thickness greater than or equal to an average width of a ridge; and all of the barbs aligned along the helical path, the helical path spanning less than or equal to 360 degrees around the tube.

2. The retaining feature of claim 1, wherein each barb has a thickness at least 150% greater that the average thickness of a ridge.

3. The retaining feature of claim 1, wherein the plurality of barbs form a single thread extending once around the exterior surface of the plastic tube.

4. The retaining feature of claim 1, wherein each barb has a height greater than a height of the ridge, each barb pressing against the interior surface of the corrugated duct.

5. The retaining feature of claim 1, wherein each barb includes a leading edge and a trailing edge defined by the relative rotation of the tube and corrugated duct during assembly, the leading edge oriented at an angle less than or equal to 45 degrees to facilitate assembly of the tube and corrugated duct.

6. The retaining feature of claim 1, wherein each barb includes a leading edge and a trailing edge defined by the relative rotation of the tube and corrugated duct during assembly, the trailing edge oriented at an angle of about 90 degrees to hamper disassembly of the tube and corrugated duct.

7. The retaining feature of claim 1, wherein each barb extends circumferentially around the tube at a helical angle of about the average helical angle of the undulations of the corrugated duct.

8. The retaining feature of claim 1, wherein each barb spans about 10 degrees to about 35 degrees circumferentially around the tube.

9. A retaining feature for connecting a plastic tube to a corrugated acoustic duct commonly used in an automobile, the corrugated duct having a series of undulations defined by a set of ridges and grooves extending helically around the duct, the retaining feature comprising:
   four barbs extending around the exterior surface of the plastic tube along a helical path, each barb sized and structured to engage an undulation of the corrugated duct;
   each barb including a leading edge and a trailing edge defined by the relative rotation of the tube and corrugated duct during assembly, the trailing edge oriented at an angle of about 90 degrees to hamper disassembly of the tube and corrugated duct, the leading edge being oriented at an angle less than or equal to 45 degrees to facilitate assembly of the tube and corrugated duct,
   the four barbs aligned along the helical path and, in combination, spanning no more than about one revolution around the plastic tube.

10. The retaining feature of claim 9, wherein each barb has a width greater than an average width of a ridge.

11. The retaining feature of claim 9, wherein each barb has a width at least 150% greater that the average width of a ridge.

12. The retaining feature of claim 9, wherein each barb has a height greater than the height of a ridge.

13. The retaining feature of claim 9, wherein each barb has a height greater than a height of the ridge, each barb pressing against the interior surface of the corrugated duct.

14. The retaining feature of claim 9, wherein each barb extends circumferentially around the tube at a helical angle of about the average helical angle of the undulations of the corrugated duct.

15. The retaining feature of claim 9, wherein each barb spans about 10 degrees to about 35 degrees circumferentially around the tube.

16. A retaining feature for connecting a plastic tube to a corrugated acoustic duct commonly used in an automobile, the corrugated duct having a series of undulations defined by a set of ridges and grooves extending helically around the duct, the retaining feature comprising:
   a first barb extending along a helical path around the exterior surface of the plastic tube;
   a second barb extending along the helical path around the exterior surface of the plastic tube;
   the first and second barb sized and structured to engage an undulation of the corrugated duct; and
   all of the barbs being aligned along the helical path that spans less than or equal to one revolution around the plastic tube.

17. The retaining feature of claim 16, wherein the helical path is oriented at an angle of about the average helical angle of the undulations of the corrugated duct.

18. The retaining feature of claim 16, wherein the first and second barbs extend circumferentially around the tube different distances.

19. The retaining feature of claim 18, wherein the first barb spans about 10 degrees, and the second barb spans about 35 degrees.

20. The retaining feature of claim 16, further comprising a third barb and a fourth barb extending circumferentially around the exterior surface of the plastic tube, the first, second, third and fourth barbs being equidistantly spaced around the tube.

21. The retaining feature of claim 20, wherein first barb Is diametrically opposed to the third barb, and wherein the second barb is diametrically opposed to the fourth barb, and wherein the first and third barbs extend circumferentially a distance different than the distance the second and fourth barbs extend circumferentially.

22. The retaining feature of claim 16, wherein each barb includes a leading edge and a trailing edge defined by the relative rotation of the tube and corrugated duct during assembly, the leading edge oriented at an angle less than or equal to 45 degrees to facilitate assembly of the tube and corrugated duct.

23. The retaining feature of claim 16, wherein each barb includes a leading edge and a trailing edge defined by the relative rotation of the tube and corrugated duct during assembly, the trailing edge oriented at an angle of about 90 degrees to hamper disassembly of the tube and corrugated duct.

24. The retaining feature of claim 16, wherein each barb has a width greater than an average width of a ridge.

25. The retaining feature of claim 16, wherein each barb has a width at least 150% greater that the average width of a ridge.

26. The retaining feature of claim 16, further comprising at least one stop wall projecting radially from the tube, the stop wall having an axially facing surface to limit the amount of overlap of the corrugated duct and tube.

27. The retaining feature of claim 26, wherein each stop wall has a height greater than a height of the first and second barbs.

* * * * *